Oct. 5, 1965    E. J. MALIK    3,209,483
MAIN AND AUXILIARY FISHHOOKS COMBINED
Filed March 6, 1964
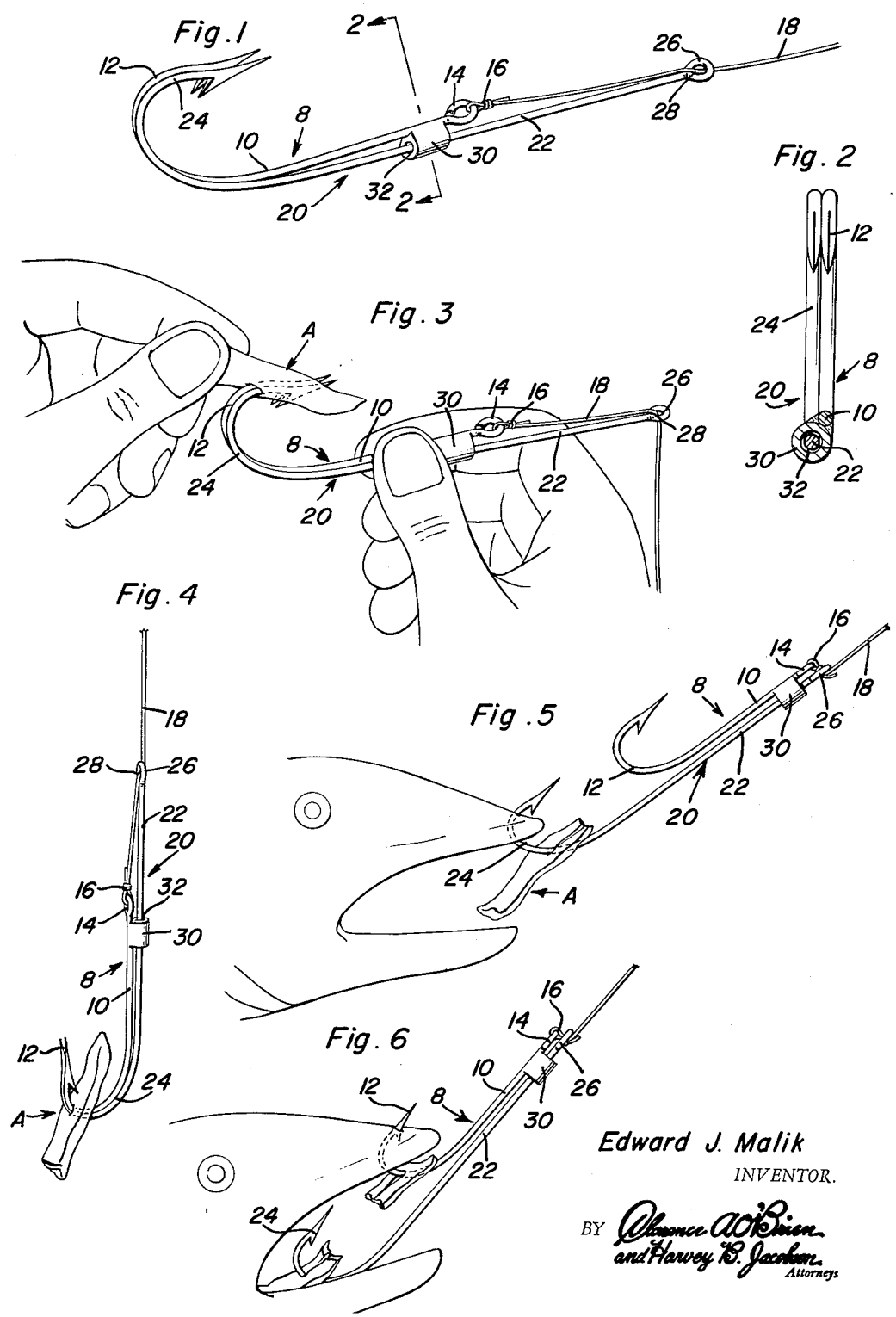
Edward J. Malik
INVENTOR.

United States Patent Office 3,209,483
Patented Oct. 5, 1965

3,209,483
MAIN AND AUXILIARY FISHHOOKS COMBINED
Edward J. Malik, Box 873, Refugio, Tex.
Filed Mar. 6, 1964, Ser. No. 349,948
3 Claims. (Cl. 43—44.82)

This invention relates to paired fishhooks each having a shank with a barbed hook at the trailing end and an eye at the leading end and wherein the shank of one fishhook is slidingly and rotatably mounted on the shank of the other fishhook in a manner that the two barbed hooks can be conjointly baited with a single bait.

The object of the invention is to improve upon dual and twin-type hooks. To the ends desired the main or principal hook has a short shank and the companion hook has a relatively long shank. The two shanks are parallel and slidingly connected together. The rear end of the fishing line is tied to the eye on the short shank and slides freely through the eye on the long shank. This construction and arrangement is functionally novel in that it permits the barbed hooks to be oriented into side-by-side relation and quickly baited so that both of the thus baited hooks can be swallowed at the same time.

Another objective has to do with making the long shank about twice as long as the short one so that under certain conditions the barbed hooks perform in such a manner that they forcibly tear the bait in half with half-portions retained on the respective hooks; or, alternatively, the sliding movement of the long shank on the short shank completely rips the bait off the short shank with the bait remaining on the hook on the long shank.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a fishhook construction showing the present invention with the main and auxiliary fishhooks readied for placement of the bait thereon;

FIGURE 2 is a view on an enlarged scale taken on the plane of the section line 2—2 of FIG. 1;

FIGURE 3 is a view in perspective similar to FIG. 1 and showing the hooks being held in a predetermined position with the right hand and the one-piece bait being applied to the barbed hooks with the left hand;

FIGURE 4 is a view on a smaller scale and also appearing in perspective and illustrating the bait fully applied and how it links or connects the barbed hooks together;

FIGURE 5 is a view illustrating one manner of making the catch wherein the main or short hook is being held by the line attached thereto and the auxiliary long hook has ripped the bait loose from the short hook and how the catch is, under the circumstances, made; and FIGURE 6 is also a view similar to FIG. 5 and wherein both main and auxiliary barbed hooks are within the confines of the open mouth of the fish and wherein half-portions of the severed bait are still intact upon their respective barbed hooks.

The short hook, also called the first hook, is designated by the reference numeral 8 and constitutes the main hook. It comprises a shank 10 provided at its lefthand or trailing end with the usual barbed hook 12. The shank is provided at its forward or leading end with an eye 14 to which the adjacent end portion 16 of the fishing line 18 is attached. The companion relatively long hook, also called the second hook, is denoted by the numeral 20 and is denoted as the auxiliary hook. It is basically the same as the main or principal hook 8 except that it is provided with a shank 22 which is approximately twice as long as the shank 10, which is provided at the rear or trailing end with a barbed hook 24 which corresponds in shape and size to the complemental hook 12. Accordingly, these two hooks 12 and 24 can be arranged in oriented side-by-side baiting relationship. The forward end of the shank terminates in an eye 26 through and beyond which the cooperating portion 28 of the fishing line slides. The two shanks 10 and 22 are connectible in side-by-side relationship by way of an adapter. While the adapter could perhaps be on the median portion of the shank 10 it is preferably integral with and lateral to the shank 10 at a point adjacent to the line-attached eye 12. The adapter is denoted at 30 and comprises a sleeve having a bore 32 therethrough which constitutes a guide bearing for the shank 22 which is slidable and rotatable in said bore.

In using the twin hook assemblage a satisfactory result can be had by following the procedure illustrated in FIG. 3. To this end the two hooks 8 and 20 are positioned so that the barbed hooks 12 are mated and the shank portions of both hooks are in side-by-side relationship with the eye 26 positioned well beyond the relatively stationary eye 14. Both hooks should be held together as shown in FIGS. 1 and 3 with the right hand. By utilizing a suitable one-piece bait A the latter can be applied with the left hand to both hooks 12 and 24 at the same time. With the hooks 8 and 20 thus baited it will be evident that the two hooks 12 and 24 can be struck and taken at the same time with the bait thereon as evident from FIG. 4. On the assumption that the line 18 is being held tight by the angler it will be also evident that the strike of the victim may result in the hooks 8 and 20 assuming the parted relationship illustrated in FIG. 5 wherein it is to be assumed that the long or auxiliary hook 20 has taken the position illustrated whereupon, when the two hooks 12 and 24 move apart the forward end of the bait is ripped loose from the barbed hook 12, stays put on the barbed hook 24 and brings about the single hook catch shown in FIG. 5.

The catch may be and often is accomplished in the third or alternate manner illustrated in FIG. 6 wherein it will be seen that both barbed hooks are within the limits of the mouth of the fish and that the action which took place here resulted in the bait A being ripped apart in half-sections with one half-section on each barbed hook. It follows that the description merely covers several ways in which the baiting and fishhooking results may be had. Because the shank 22 both slides and rotates in its bearing 32 it will be evident that the two barbed hooks may assume varying positions and relationship neither shown nor particularly described.

It is significant to keep in mind that the fishing line must be tied to the eye of the main or primary hook 8 and the portion 28 should permit the eye 26 to slide and turn freely relative thereto.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a first fishhook constituting a main hook and embodying a shank having a barbed hook at the trailing end and a line eye at the leading end, a fishing line having its rearward end positively connected to said eye, a second fishhook, the latter constituting an auxiliary hook and embodying a shank of a length greater than the length of the first-named shank and having a barbed hook at its trailing end and an eye at its leading end through which said line is threaded but is freely slidable, said barbed hooks being substantially identical in construction and capable of being oriented in side-by-side alignment to permit temporary linking of the same together with a one-piece readily applicable bait, and adapter means cooperable with and slidingly connecting the two shanks in side-by-side cooperative relationship and permitting one shank to slide and rotate freely relative to the other shank.

2. The structure defined in claim 1 and wherein said means comprises an adapter sleeve fixed on the shank of said first hook, the bore of said sleeve providing a bearing, and the shank of said second fishhook being slidably and rotatably mounted in said bearing.

3. In combination, a first fishhook embodying a shank having a barbed hook at one end and an eye for the attachment of a fishing line at the other end, a second fishhook, said second fishhook being auxiliary and complemental to said first fishhook and embodying a shank of a length greater than the length of the shank of the first fishhook and having a barbed hook at one end and a line accommodating and guiding eye at the other end through which the fishing line, when in use, is adapted to be threaded and permitted to slide freely, said barbed hooks being at corresponding ends of the shanks and being substantially identical in construction and capable of being oriented in side-by-side alignment to permit temporary linking of the barbed hook portions by a single piece of readily applicable but disruptable bait, and an adapter sleeve fixed on the shank of said first hook and lateral thereto, the bore of said sleeve constituting and providing a bearing, and the shank of said second fishhook being freely slidable and rotatable in said bearing.

References Cited by the Examiner
UNITED STATES PATENTS

| | | | |
|---|---|---|---|
| 989,392 | 4/11 | Mueller | 43—44.82 X |
| 2,640,291 | 6/53 | Garner | 43—44.82 X |
| 2,783,580 | 3/57 | Balboni | 43—44.82 |

ABRAHAM G. STONE, *Primary Examiner.*